(12) United States Patent
Jary (10) Patent No.: US 7,875,160 B2
(45) Date of Patent: Jan. 25, 2011

(54) METHOD FOR CONTROLLING A COMMUNICATION BETWEEN TWO AREAS BY ELECTROWETTING, A DEVICE INCLUDING AREAS ISOLATABLE FROM EACH OTHER AND METHOD FOR MAKING SUCH A DEVICE

(75) Inventor: Dorothee Jary, Sassenage (FR)

(73) Assignee: Commissariat a l'Energie Atomique, Paris (FR)

( * ) Notice: Subject to any disclaimer, the term of this patent is extended or adjusted under 35 U.S.C. 154(b) by 427 days.

(21) Appl. No.: 11/989,460

(22) PCT Filed: Jul. 25, 2006

(86) PCT No.: PCT/EP2006/064613

§ 371 (c)(1),
(2), (4) Date: Jan. 25, 2008

(87) PCT Pub. No.: WO2007/012638

PCT Pub. Date: Feb. 1, 2007

(65) Prior Publication Data

US 2009/0134027 A1     May 28, 2009

(30) Foreign Application Priority Data

Jul. 25, 2005    (FR) .................................. 05 52299

(51) Int. Cl.
*G01N 27/26* (2006.01)

(52) U.S. Cl. ..................... 204/450; 204/600; 204/672

(58) Field of Classification Search ......... 204/600–672, 204/450–455
See application file for complete search history.

(56) References Cited

U.S. PATENT DOCUMENTS

| 6,379,929 | B1* | 4/2002 | Burns et al. ................ 435/91.2 |
| 2003/0019522 | A1 | 1/2003 | Parunak |
| 2004/0055536 | A1 | 3/2004 | Kolar et al. |

FOREIGN PATENT DOCUMENTS

| EP | 1347353 A1 | 9/2003 |
| FR | 2841063 A1 | 12/2003 |
| FR | 2887705 A1 | 12/2006 |
| WO | 2006070162 A1 | 6/2006 |

OTHER PUBLICATIONS

Liu, Robin H. et al., "Fabrication and Characterization of Hydrogel-Based Microvalves," Journal of Microelectromechanical Systems, vol. 11, No. 1, Feb. 2002, pp. 45-53.

(Continued)

*Primary Examiner*—Alexa D Neckel
*Assistant Examiner*—Jennifer Dieterle
(74) *Attorney, Agent, or Firm*—Nixon Peabody LLP (57) ABSTRACT

Device for displacing drops of liquid by electrowetting, and a method for isolating two areas delimited by at least one wall including a step for:
placing by electrowetting, in an aperture of said wall, a substance capable of reacting to at least one external stimulus in order to pass from a liquid state to a gel or solid state, forming a closure member.

29 Claims, 3 Drawing Sheets

OTHER PUBLICATIONS

Liu, Robin H. et al., "Self-Contained, Fully Integrated Biochip for Sample Preparation, Polymerase Chain Reaction Amplifications, and DNA Microarray Detection," Analytical Chemical, vol. 76, No. 7, Apr. 1, 2004, pp. 1824-1831.

Pal, Rohit et al., "Phase Change Microvalve for Integrated Devices," Analytical Chemistry, vol. 76, No. 13, Jul. 1, 2004, pp. 3740-3748.

Pollack, M.G. et al., "Electrowetting-Based Actuation of Droplets for Integrated Microfluidics," Lab Chip, 2002, 2, pp. 96-101.

* cited by examiner

METHOD FOR CONTROLLING A COMMUNICATION BETWEEN TWO AREAS BY ELECTROWETTING, A DEVICE INCLUDING AREAS ISOLATABLE FROM EACH OTHER AND METHOD FOR MAKING SUCH A DEVICE

CROSS REFERENCE TO RELATED APPLICATIONS OR PRIORITY CLAIM

This application is a national phase of International Application No. PCT/EP2006/064613 entitled "Method For Controlling Communication Between Two Electrowetting Zones, Device Comprising Zones Capable Of Being Isolatable From One Another And Method For Making Such A Device", which was filed on Jul. 25, 2006, which was not published in English, and which claims priority of the French Patent Application No. 05 52299 filed Jul. 25, 2005.

TECHNICAL FIELD AND PRIOR ART

The present invention relates to a method for controlling a communication between two areas by electrowetting, to a device including areas isolatable from each other and capable of containing, notably, liquids, solids and/or gases and to a method for making such a device.

One of the most used displacement or handling modes is based on the principle of electrowetting on a dielectric, as described in the article of M. G. Pollack, A. D. Shendorov, R. B. Fair, entitled <<Electrowetting-based actuation of droplets for integrated microfluidics>>, Lab Chip 2 (1) (2002) 96-101.

The forces used for the displacement are electrostatic forces.

Document FR 2 841 063 describes a device applying a catenary facing electrodes activated for the displacement.

The principle of this type of displacement is the following.

A drop lies on a network of electrodes, from which it is isolated by a dielectric layer and a hydrophobic layer.

When an electrode located in proximity to the drop is activated, the dielectric layer and the hydrophobic layer, between this activated electrode and the drop polarized by an electrode, act as a capacitance. The electrostatic charge effects induce displacement of the drop on this electrode. The electrode may be a catenary, it then maintains an electric contact with the drop during its displacement, as described in document FR—2 841 063.

The drop may thus be displaced step-by-step on the hydrophobic surface, by successively activating electrodes of the matrix of electrodes and by guiding it along the catenary.

It is therefore possible to displace liquids, but also to mix them (by having drops of different liquids approach each other), and to achieve complex protocols.

The documents mentioned above give examples of applying a series of adjacent electrodes for handling a drop in a plane.

This type of displacement is increasingly used in devices called biochips, for biochemical, chemical or biological analyses, either in the medical field, or in the monitoring of the environment, or in the field of quality control.

In order to be able to perform the analyses stated earlier, it is of interest to be able to have areas isolated from each other on the biochip and capable of being put into communication, so as to allow mixing of reagents contained in at least two areas and/or to be able to convey the reagents towards an analysis area on a solid support, for example a fluorescence detection area.

Microsystems are known, including resin walls provided with communication passages blocked by valves, said valves being actuatable so as to either allow communication between the different areas or not.

For example, from documents Robin Hui Liu et al., *Anal. Chem.* 2004, 76, 1824-1831 and Rohit Pal et al., *Anal. Chem.* 2004, 76, 3740-3748, it is known how to produce a valve in a meltable material of the wax or paraffin type, which either blocks the communication passage or not, depending on the temperature. This material is deposited when manufacturing the micro-system. In order to open the valve, the wax is heated and then displaced by applying pneumatic pressure. This type of valve therefore requires provision of a pressure generator or a pressure reserve for moving the molten plug away from the communication passage.

A valve including a membrane and hydrogel pads is also known from document Robin Hui Liu et al., *Journal of Microelectromechanical Systems* 2002, 11, 45-53. When the hydrogel inflates, it deforms the membrane, which blocks a communication passage. The passage is open when the gel is deflated. Inflating and deflating of the pads are obtained for example by changing the pH or the temperature.

However, manufacturing such valves requires provision of their location during the making of the chip and the use of a physical mask and of light insolation in order to carry out local polymerization. Once the valves are put into place, they cannot be displaced on the chip depending on the desires of the user.

Accordingly, an object of the present invention is to provide a device including areas capable of communicating with each other by means of communication passages, the passages being able to be opened and closed several times.

An object to the present invention is also to provide great flexibility in the creation of communication passages and in the blocking of the latter.

DISCLOSURE OF THE INVENTION

The goals stated earlier are achieved by using the liquid drop displacement principle by electrowetting, in order to displace a substance capable of changing state by applying to it an external stimulation so that it either forms a closure member or not. The substance, when it is in the liquid form, may be put into place by electrowetting in a passage to be blocked, and the substance is then solidified or transformed into a gel in order to form a plug. If it is desired to open the passage, the substance is liquefied and removed from the passage by electrowetting.

The main object of the present invention is therefore the use of a device for displacing liquid drops by electrowetting for controlling at least one communication between two areas, by means of at least one substance capable of reacting to at least one external stimulus for changing state.

The object of the present invention is also a method for isolating two areas delimited by at least one wall, including a step for:

placing by electrowetting, in an aperture of said wall, a substance capable of reacting to at least one external stimulus in order to pass from a liquid state to a solid or gel state, forming a closure member.

The object of the present invention is also a method for having two areas delimited by a wall communicate, including a step for:

removing by electrowetting, from an aperture of said wall, a substance capable of reacting to at least an external stimulus in order to pass from a solid or gel state to a liquid state.

The object of the present invention is also a method for controlling the communication between two areas delimited by at least one wall using:
- an isolation method according to the present invention,
- a method for providing communication according to the present invention.

The application of the stimulus may for example include a change in temperature of the substance and/or an illumination of the latter and/or an application of a magnetic field and/or a variation of an ionic strength and/or contacting said substance with at least a second drop of liquid capable of changing the state of the substance.

Advantageously, said second drop is brought into contact with said substance by electrowetting.

In an exemplary embodiment, said substance includes a sugar, which may be placed as a liquid in the aperture between both areas, and then heated until the sugar crystallizes, so as to close the communication, and/or which may, in the crystallized form, be put into contact with a drop of aqueous solution by electrowetting, and then removed as a liquid containing the sugar, in order to open the communication.

Advantageously, said method includes a heating step during the contacting.

In another example, said substance includes a heat-sensitive polymer, which may be put into place as particles suspended in a drop of liquid in the aperture between both areas, and then heated until said polymer solubilizes and cooled until a gel forms for closing the communication, and/or which may, as a gel, be put into contact with a drop containing an enzyme capable of dissolving the gel, by electrowetting, and/or be heated and then removed as a liquid containing the polymer, in order to open the communication.

For example, when the polymer is agarose, β-agarase is used for dissolving the agarose gel.

The heating temperature of non-solubilized agarose is advantageously comprised between 40° C. and 80° C., and the cooling temperature is advantageously comprised between 4° C. and 40° C.

Advantageously, the heating temperature for the agarose gel is comprised between 40° C. and 80° C.

The object of the present invention is also a device with which the method according to the present invention may be applied, including at least two areas separated by a wall, at least one communication passage formed in said wall, at least one first substance as a first drop of liquid or as a solid or a gel, said substance as a liquid being capable of being transformed into a solid or a gel when it is subject to at least one first stimulus and/or said substance as a solid or a gel being capable of liquefying when it is subject to at least one second stimulus, means for displacing said substance by electrowetting in order to bring it into the communication passage or to move it away from the latter and means for applying at least one of said stimuli to the substance.

The means for applying at least said stimuli for example include at least one heating and/or cooling means, and/or a means for illuminating the substance, and/or a means for varying an ionic strength, and/or a means for applying a magnetic field to the substance, and/or a means for putting the substance into contact with a second drop of liquid capable of reacting with the substance placed in the passage, so as to transform the liquid substance into a solid or a gel, and the solid or gel substance into a liquid.

The heating means may be a resistor positioned in the substrate.

Advantageously, the means for putting the substance into contact with the second drop of liquid includes displacement means by electrowetting.

The walls are advantageously made in resin.

For example, the substance is a sugar.

The substance may include a heat-sensitive polymer, for example of agarose, pectin, carraghenan, gelatin, calcium alginate, a cellulose derivative, chitosan in the presence of acid, a synthetic polymer used in a suitable solvent, such as polyvinyl chloride, a poloxamer (Pluronic®), polystyrene, and/or polymethyl methacrylate.

The second drop is advantageously an enzyme, for example β-agarase in the case of agarose.

The substance may also be a resin different from the one forming the walls and capable of passing from a liquid state to a solid state or from a solid state to a liquid state.

The areas may include at least one area for storing an electric insulator fluid and/or at least one area for storing at least one dry reagent and/or at least one area for storing at least one liquid reagent and/or at least one area for storing gas and/or at least one fluorescence detection area on a solid support.

Additionally, provision may be made for at least one area for storing the substance as a liquid.

Preferably, the device according to the present invention includes electrowetting means for displacement between the different areas.

In an exemplary embodiment, DNA hybridization reactions and/or antigen/antibody reactions between proteins are conducted on a solid support, for example in the fluorescence detection area.

Electrowetting devices advantageously include a substrate with a hydrophobic surface provided with a network of electrowetting electrodes and electrically conducting means forming a counter-electrode of the electrowetting electrodes, positioned facing each other, which may be connected to electric power supply means so as to allow an electrostatic force to be applied to the drop of liquid.

The device according to the present invention may include a second substrate facing the hydrophobic surface, forming a lid.

The counter-electrode may be borne by the lid or be formed by a suspended conducting wire.

The object of the present invention is also a manufacturing method including the steps:
- depositing a first resin layer on a substrate,
- depositing a mask and etching said first resin layer in order to form walls,
- depositing a second resin layer and etching the latter in order to form the plugs.

SHORT DESCRIPTION OF THE DRAWINGS

The present invention will be better understood by means of the description which follows and the appended drawings wherein.

DETAILED DISCUSSION OF PARTICULAR EMBODIMENTS

Figure 1:
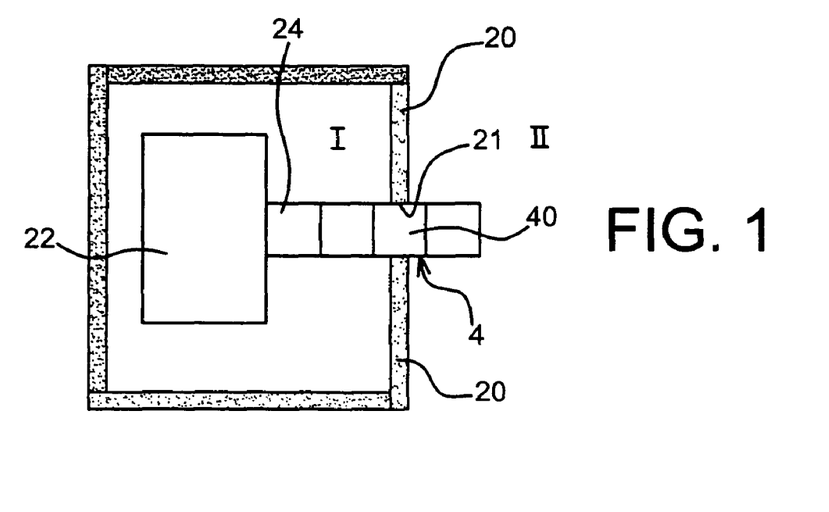
FIG. 1 is a schematic top view of a device according to the present invention.

In FIG. 1, a device according to the present invention may be seen including at least one area I, one area II, separated by a partition 20, for example in resin. The partition 20 includes at least one aperture 21 providing communication between the areas I and II. These areas I, II form compartments capable of receiving products which one wishes to isolate from each other, at least for a certain time. Only two compartments are illustrated, however more than two compartments may be provided as this will be described subsequently. The communication passages will be provided according to the type of compartment.

The device according to the invention is, a microsystem for example, an analysis chip, a so-called biochip, on which reactions between small drops or small volumes of liquid are conducted. These drops of liquid are advantageously displaced by electrowetting.

The compartment I includes a reservoir electrode 22 on which the product to be isolated from the area II and a network 4 of electrodes are found in order to allow the displacement of the substance intended to block the passage. In the illustrated example, one end 24 of the network 4 is adjacent to the electrode 22 so as to also allow the displacement of the product by electrowetting, as this will be described subsequently. A separate network of electrodes may however be provided.

The network 4 includes at least one electrode 40 located very close to the passage 21, advantageously in the passage 21 so as to place the substance intended to block the passage, substantially in the passage 21.

Figure 2A:
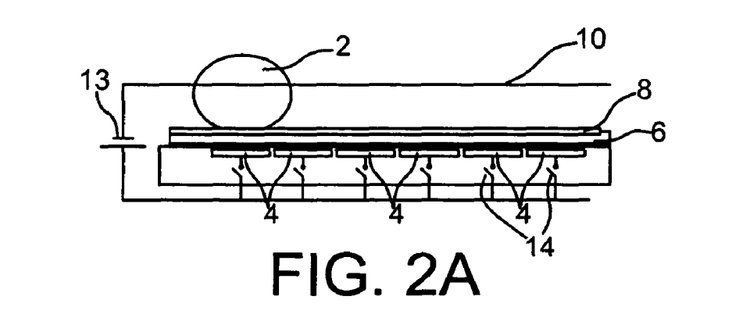
FIGS. 2a-2c are partial side views of the device of FIG. 1.
Figure 2B:
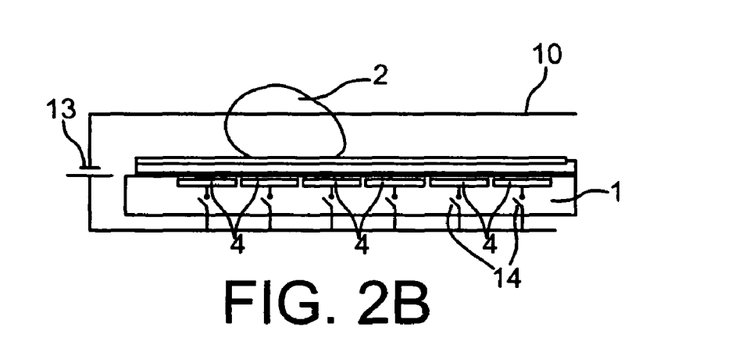
Figure 2C:
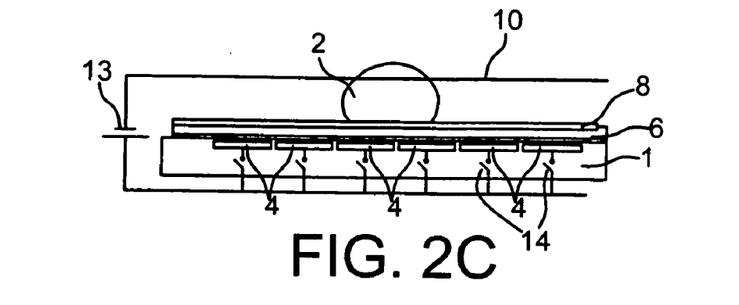

In FIGS. 2a-2c, a partial side view of the first displacement means 4 by electrowetting may be seen, synthesizing the principle of this type of displacement.

Examples of such devices are described in the article of M. G. Pollack, A. D. Shendorov, R. B. Fair, entitled <<Electrowetting-based actuation of droplets for integrated microfluidics>>, Lab Chip 2 (1) (2002) 96-101.

The forces used for displacing drops of liquid are electrostatic forces.

Document FR 2 841 063 also describes a device further applying a catenary as a counter-electrode, facing electrowetting electrodes for the displacement.

Figure 3A:
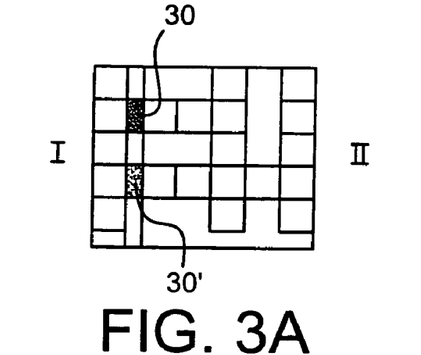
FIGS. 3A-3G illustrate the different steps of a method according to the present invention.

A drop 2 lies on a network 4 of electrodes, from which it is isolated by a dielectric layer 6 and a hydrophobic layer 8 (FIG. 3A).

The hydrophobicity of this layer means that the drop has a contact angle larger than 90° on this layer.

The electrodes are themselves formed at the surface of a substrate 1.

When the electrode of the network 4 located in proximity to the drop 2 is activated, by switching means 14, the closing of which establishes a contact between this electrode and a voltage source 13 via a common conductor 16, the dielectric layer 6 and the hydrophobic layer 8 between this activated electrode and the drop, permanently polarized by a counter-electrode 10, act as a capacitance. The effects of electrostatic charges induce the displacement of the drop on the activated electrode. The counter-electrode 10 allows the displacement by electrowetting, it maintains an electric-contact with the drop during its displacement. This counter-electrode 10 may either be a catenary as described in FR—2 841 063, or a buried wire, or a planar electrode on or in the lid of the confined systems.

The drops advantageously lie in a liquid which is non-miscible with that of the drops, for example oil, when the drops are formed with an aqueous solution. With this, evaporation of the drops may be avoided and the tension required for displacements may be changed by reducing the interfacial tension between the aqueous solution forming the drops and the oil, relatively to the interfacial tension between the aqueous solution and the air.

Thus, drops contained in the different compartments may be put into contact, for diluting a substance or for reacting a substance contained in one of the drops.

The compartments may be of different types. A first type of compartment may form an area for storing dry reagents, in this case at least one drop of liquid will penetrate into the compartment in order to dissolve the dry reagent and will allow it to be displaced as a drop of liquid. Advantageously, provision may be made for as many compartments as there are different dry reagents, so as to avoid any risk of contamination of the reagents with each other. A second type of compartment may be an area for storing liquid reagents. A third type of compartment may contain a gas.

A fourth type of compartment may be a detection area, for example a fluorescence detection area into which is brought a product containing substances to be analyzed, for example in order to measure their concentration. Reactions may be conducted in this area, such as DNA hybridization reactions or antigen/antibody reactions between proteins.

A fifth type of compartment may also be provided, containing the electrically insulating fluid, for example silicon oil, allowing its confinement until the device is used.

Preferably, the detection area is isolated from the electric insulating fluid, in order to reduce background noises generated by the electric insulating fluid.

Indeed, in the case of a hybridization chip, the non-miscible liquid with an aqueous phase present on this chip may interfere with the detection. On the other hand, the latter may form a liquid film on the DNA molecules present on the surface of the hybridization chip, the non-miscible liquid will then reduce the accessibility of these DNA molecules and therefore the hybridization yield. On the other hand, this non-miscible liquid may be dispersed as droplets in and/or on the drop of aqueous solution, which will generate an inhomogeneous fluorescence signal with a strong non-reproducible background noise between the different experiments.

It is also preferable to isolate this detection area from the electric insulator fluid because storage of the DNA molecules grafted on the surface of the hybridization area will be better under a dry or inert atmosphere than under a liquid.

According to the present invention, provision is made for controlling the opening and closing of communication passages between the compartments by means of a displacement device by electrowetting as described earlier, for the drops of liquid to be analyzed.

The method according to the present invention controls the communication between the areas I and II and includes the following steps:

placing or removing a closure member by electrowetting, said closure member including a substance capable of reacting to at least one external stimulus in order to change state.

In particular, provision is thus made for displacing at least one drop of liquid, the drop containing a substance capable of solidifying and of gelling, the displacement occurring by electrowetting along the network 4, right up to the communication passage to be blocked. This substance contained in the drop of liquid is then reacted in order to form a plug.

By solid or gel is meant any substance which does not spontaneously flow on a surface and is not deformed when a voltage is applied on the electrodes close to the ones on which the drop of solid or gel is found.

The change of state of the substance may be caused by at least one of the following stimuli, given as an example, a change in temperature, notably a rise in temperature, a change in pH, or in the composition of a solvent containing the substance, a product with which the substance will react, application of a light, a change in an ionic strength, and/or an application of a magnetic field.

The thereby solidified or gelled substance is in contact with the wall 20 on either side of the passage. This plug thus sealably blocks the communication between the areas I and II.

The rise in temperature may be obtained for example by a heating area present under the chip or by a heating resistor positioned in the chip. The heating area is an area with a defined size which includes one or more electrodes, and the temperature of which may be increased or reduced controllably. The heating area or the heating resistor is placed at right angles to the communication passage, the substance is thus solidified or gelled directly in the passage to be blocked.

The heating means may also be formed by catenaries.

In the case when the change of state of the substance is obtained by changing the pH or by reaction with a chemical reagent, by a change of solvent or of ionic strength, this change of state is obtained by putting the substance into contact with a drop of liquid capable of varying the sought parameter, in order to transform the substance into a solid or into a gel. Advantageously, the second drop of liquid is displaced by electrowetting right up to the passage to be blocked.

Opening the communication passage may for example be performed by advantageously bringing by electrowetting a third drop of liquid capable of dissolving the solid or the gel forming the closure member.

A change, notably an increase in temperature or an action of light or a variation in pH, or the action of an enzyme, or the variation of the ionic strength, the application of a magnetic field, or the reaction with a chemical reagent, may be contemplated depending on the substance used. Of course, it is understood that the change of state may result from one or several stimuli in the non-exhaustive list above.

We shall now describe by means of FIGS. 3a-3g, the principle for opening a communication between two areas.

In FIG. 3A, a device may be seen, provided with two areas I and II separated by a resin wall 20, with electrowetting displacement paths 26, 28 of a structure similar to the one described earlier, capable of displacing small volumes of liquid between the areas I and II.

The paths 26, 28 cross the wall 20 at both passages 21, 21' respectively, provided in the wall 20, and blocked in FIG. 3a by a plug 30, 30' respectively. These plugs 30 are capable of liquefying under the action of at least one external stimulus, among those mentioned above.

In the illustrated example, the plugs are capable of being dissolved upon contact with a drop of solvent 32.

Figure 3B:
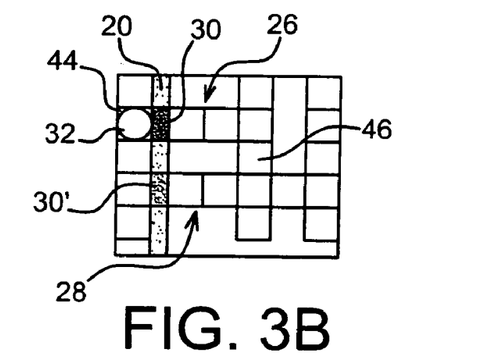

In FIG. 3B, the drop of solvent is positioned on the path 26 on an electrode 44 adjacent to the electrode 40 and aligned with the passage 21.

Figure 3C:
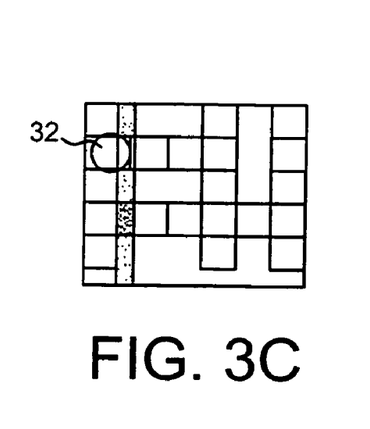
Figure 3D:
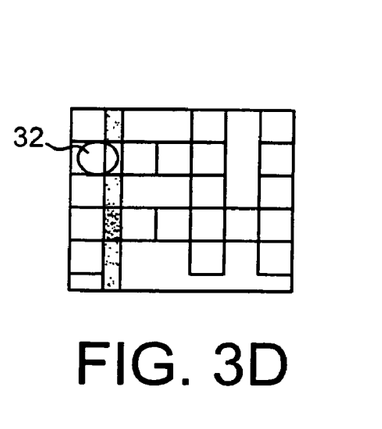

In FIG. 3C, the electrode 40 is activated, the drop 32 is displaced towards the plug 30 and will contact the latter. The plug is dissolved, until it completely frees the passage 21 (FIG. 3d).

Figure 3E:
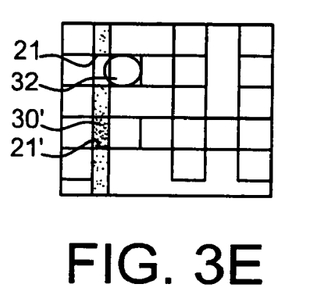
Figure 3F:
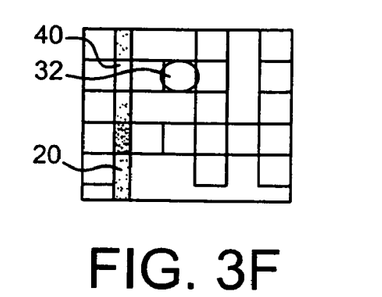
Figure 3G:
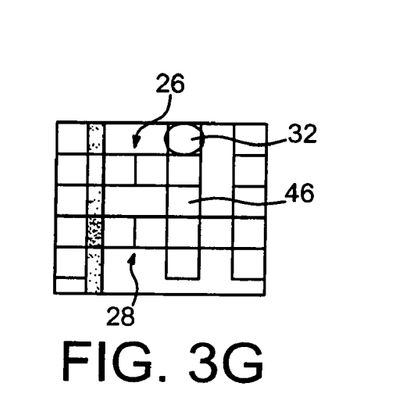

In FIGS. 3E-3G, the following electrodes of the path 26 are then each activated in turn causing the displacement of the drop 32 loaded with the dissolved substance of the plug 30, in order to free the passage 21.

This drop 30 may be used for dissolving the plug 30' by returning to the path 28 connected to the path 26 by electrodes 46 or be discharged. This drop 32 may also be stored and used for reforming the plug 30, for example by heating the drop 30, when it is on the electrode 40.

The substance may include a heat-sensitive polymer which may be brought as particles suspended in a drop of liquid, into the aperture between both areas and then heated until the polymer solubilizes and cooled until a gel forms for closing the communication. The polymer may for example be agarose, a gelling agent customarily used in the food or pharmaceutical industry (pectin, carraghenan, gelatin, calcium alginate, cellulose derivatives, chitosan in the presence of acid . . . ), or a synthetic polymer used in a suitable solvent such as polyvinyl chloride, poloxamer (also known as Pluronic®), polystyrene, polymethyl methacrylate (PMMA). Depending on the cases, the formed gel may be put into contact with a drop containing an enzyme destroying the gel (for example β-agarase in the case of an agarose gel) by electrowetting and/or may be heated and then removed as a liquid containing the polymer in order to open the communication.

Two examples of closing and opening a communication passage according to the present invention will be described.

The areas I and II will respectively contain substances which one desires to isolate in a first phase.

A drop of water containing sugar is brought by electrowetting into the passage 21 between the areas I and II to be blocked. The drop of liquid is heated, as described earlier, which causes evaporation of the water of the drop and crystallization of the sugar in the passage. The communication between both areas is then interrupted. The resulting size of the crystallized sugar is provided so that it enters into contact with the resin wall in order to completely block the passage 21.

When it is desired to re-open the passage, in order to for example react the products contained in each of the compartments, a drop of liquid, for example water, is brought by electrowetting into contact with the crystallized sugar. The sugar crystals solubilize. Additionally, heating may be provided in order to accelerate solubilization of the sugar.

When the sugar is solubilized in the drop of water, the latter is removed from the passage, by electrowetting, in order to clear the latter. The passage is again open, provision may then be made for displacing by electrowetting the products contained in the compartments communicating from now on with each other in order to have them react.

The drop of water containing the sugar may be discharged or stored for another use in the same passage or in another passage.

Sugar has the advantage of being biocompatible, its use therefore does not require any particular precautions, e.g. it does not require any rinsing.

Thus, the chip may include an area for storing substances capable of forming a closure member. These substances may be kept as a liquid or as a solid. In the latter case, provision is made for bringing a drop of liquid in order to solubilize the substance and to then convey the liquid drop containing the substance into the passage to be blocked.

It may also be contemplated to close the communication passage again, for example in the case when the compartments form reservoirs, in which the product is sampled several times. After each sampling, the passage is blocked.

In another exemplary embodiment, a gate for blocking a communication passage may also be formed by the agarose. In order to block a passage, a drop containing non-solubilized agarose is brought into the passage to be blocked. The drop is then heated at a temperature advantageously comprised between 40° C. and 80° C., for example 70° C., by the means described earlier, in order to solubilize the agarose, and then cooled to a lower temperature advantageously comprised between 4° C. and 40° C., for example 30° C., in order to cause gelling of the agarose. The passage is then blocked by this gel.

When it is desired to open this passage, the temperature of the passage is again raised above 70° C. in order to melt the agarose. When the agarose is in the liquid form, the drop of liquid agarose is displaced by electrowetting in order to move it away from the passage.

Provision may also be made for opening the passage by bringing a β-agarase solution by electrowetting into contact with the agarose gel. β-agarase has the effect of cutting the large chains into subunits, which transforms the gelled agarose into liquid agarose. Simultaneously, the agarose is heated in order to assist this liquefaction at a temperature advantageously comprised between 40° C. and 80° C., for example 37° C.

Advantageously, the network of electrodes for displacing the blocking substance may be used for displacing products contained in the compartments.

Provision may be made for directly manufacturing chips including walls provided with a passage blocked by a solid or a liquid which may easily be transformed into a liquid, as described earlier, and for opening these passages when using the chip.

Provision may for example be made during manufacturing, for depositing at the locations of the passages, a resin different from that of the walls. This resin will for example be annealed very little so as to be easily suppressed with a drop of solvent of the alcohol or acetone type. And then in order to be able to open and close the passages at will, a solution containing another substance capable of changing state several times, for example a concentrated aqueous solution, such as a sugar solution or a salt solution of the NaCl type, is deposited on the chip. This substance will be handled as described earlier.

This embodiment has the advantage of using standard microelectronics techniques in order to produce the whole chip, both the plugs and the walls.

In the case when the solvent is not compatible with the use of the biochip, provision may be made for rinsing the chip by having for example a few drops of water flow on the paths followed by the drops of solvent.

This manufacturing method therefore includes the steps:
depositing on a substrate a first resin layer,
depositing a mask and etching said first resin layer in order to form the definitive walls,
depositing a second resin layer and etching the latter in order to form the plugs.

Figure 4:
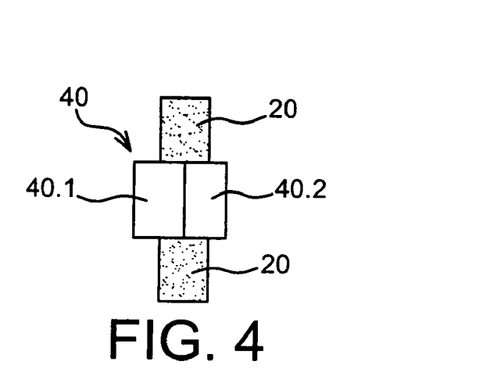
FIGS. 4-7 are schematic illustrations of details of alternative embodiments of the device according to the present invention.
Figure 5:
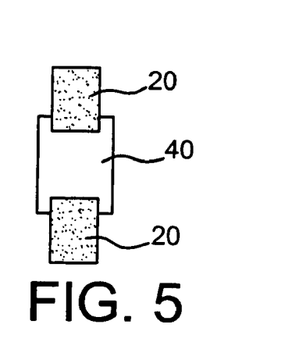
Figure 6:
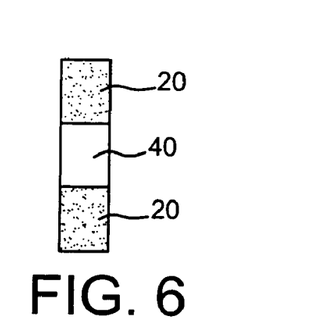

In FIGS. 4-6, different exemplary embodiments may be seen of the electrowetting electrode located at the communication passage, which will be a centre for transforming the state of the drop.

In FIG. 4, the electrode 40 is formed by two electrodes 40.1 and 40.2 with which first and second drops of liquid may be conveyed, the first containing for example the substance capable of changing state and the second drop containing a reagent or a solution, for example capable of changing the pH of the first drop in order to cause solidification or gelling of the substance.

Figure 7:
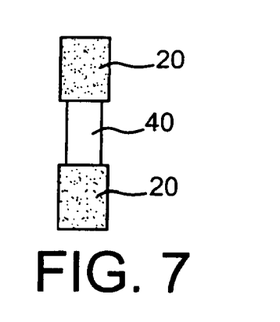

Provision may be also made for an electrode 40 with a width larger than that of the walls (FIG. 5), equal to that of the walls (FIG. 6) or smaller than that of the walls (FIG. 7).

The size and the shape of the electrode 40 change the size and the shape of the solid closure member or as a gel. The shape of the electrode 40 will notably be selected in order to obtain a sealed solid or gel closure member.

The selection of the material forming the plug is performed depending on the products contained in the compartments to be isolated.

With the present invention, it is possible to create separation gates for compartments depending on the uses of the chip. Absence of contamination may thereby be guaranteed between the reagents on-board the chip during its transport and its handling before its use for the intended test, and areas such as a detection area of the DNA chip type, may be preserved from contact with the oil type insulating liquid allowing handling of the drops by electrowetting.

Blocking or opening several passages simultaneously may be provided, by adequately controlling the means for addressing the electrodes in order to convey the drops containing the substances or the reagents to the passages.

The invention claimed is:

1. A method for isolating two areas, comprising:
providing one or more walls between the two areas, wherein the one or more walls contain one or more apertures;
placing, by electrowetting in the one or more apertures, a substance in a liquid state capable of reacting to at least one external stimulus in order to pass from the liquid state to a solid or gel state;
applying the at least one external stimulus, thereby causing the substance to pass from the liquid state to the solid or gel state forming a closure member.

2. A method for having two areas communicate, comprising:
providing one or more walls between the two areas, wherein the one or more walls contain one or more apertures, and wherein the one or more apertures contains a substance in a solid or gel state capable of reacting to at least one external stimulus in order to pass from the solid or gel state to a liquid state;
applying at least one external stimulus, thereby causing the substance to pass from the solid or gel state to the liquid state;
while the substance is in the liquid state, removing the substance by electrowetting from the one or more apertures.

3. A method for controlling the communication between two areas, comprising:
providing one or more walls between the two areas, wherein the one or more walls contain one or more apertures;
providing a substance capable of reacting to a first external stimulus in order to pass from a liquid state to a solid or gel state, and capable of reacting to a second external stimulus in order to pass from a solid or gel state to a liquid state;
placing by electrowetting in the one or more apertures, the substance in the liquid state;
while the substance is in the one or more apertures in the liquid state, applying the first external stimulus, thereby causing the substance to pass from the liquid state to the solid or gel state forming a closure member;
while the substance is in the one or more apertures in the solid or gel state, applying the second external stimulus, thereby causing the substance to pass from the solid or gel state to the liquid state;
while the substance is in the liquid state, removing the substance by electrowetting from the one or more apertures.

4. The method according to claim 3, wherein the first external stimulus and the second external stimulus are selected from the group consisting of: a change in the temperature of the substance, illumination of the substance, application of a magnetic field, variation of an ionic strength, and contacting said substance with at least one second drop of liquid capable of changing the state of the substance.

5. The method according claim 4, wherein the first external stimulus and/or the second external stimulus consist of contacting said substance with at least one second drop of liquid capable of changing the state of the substance, and wherein said second drop is brought into contact with said substance by electrowetting.

6. The method according to claim 3, wherein said substance comprises a sugar, wherein the first stimulus comprises heating until the sugar crystallizes, and wherein the second stimulus comprises contacting the substance with a drop of aqueous solution by electrowetting to dissolve the substance.

7. The method according to claim 6, wherein the second stimulus further comprises heating.

8. The method according claim 3, wherein said substance comprises, in its liquid state, a heat-sensitive polymer suspended in a liquid, wherein the first stimulus comprises heating the substance until the polymer solubilizes, and cooling the substance until a gel forms one or more apertures, and wherein the second stimulus comprises contacting the substance with a drop of enzyme by electrowetting to dissolve the substance.

9. The method according to claim 8, wherein the polymer is agarose and the enzyme is β-agarase.

10. The method according to claim 9, wherein the temperature for heating the non-solubilized agarose is comprised between 40° C. and 80° C.

11. The method according to claim 9, wherein the cooling temperature is comprised between 4° C. and 40° C.

12. The method according to claim 9, wherein the second stimulus further comprises heating, and the temperature for heating the agarose gel is comprised between 40° and 80° .

13. A device for displacing drops by electrowetting including at least two areas separated by a wall, at least one communication passage formed in said wall, at least one first substance as a first drop of liquid or a solid or a gel, said substance as a liquid being capable of being transformed into a solid or a gel when it is subject to at least one first stimulus and/or said substance as a solid or a gel being capable of liquefying when it is subject to at least a second stimulus, means for displacing by electrowetting said substance in order to bring it into the communication passage or to move it away therefrom and means for applying at least one stimulus to the substance.

14. The device according to claim 13, wherein the substance is a sugar.

15. The device according to claim 13, wherein the areas include at least one area for storing an electric insulator fluid and/or at least one area for storing at least one dry reagent and/or at least one area for storing at least one liquid reagent and/or at least one area for storing gas and/or at least one fluorescence detection area.

16. The device according to claim 13, including at least one area for storing the substance as a liquid.

17. The device according to claim 13, including electrowetting displacement means between the different areas.

18. The device according to claim 13, wherein the areas include at least one area for storing an electric insulator fluid and/or at least one area for storing at least one dry reagent and/or at least one area for storing at least one liquid reagent and/or at least one area for storing gas and/or at least one fluorescence detection area, and wherein DNA hybridization reactions, and/or antigen/antibody reactions between proteins are conducted in the fluorescence detection area.

19. The device according to claim 13, wherein the separation wall is in resin.

20. The device according to claim 19, wherein the substance is a resin different from the one forming the walls and capable of passing from a liquid state to a solid state or from a solid state to a liquid state.

21. The device according to claim 13, wherein the means for applying the stimulus is selected from the group consisting of: at least one heating means and/or cooling means, means for illuminating the substance, means for varying an ionic strength, means for applying a magnetic field to the substance, and means for putting the substance in contact with a second drop of liquid capable of reacting with the substance placed in the passage so as to transform the liquid substance into a solid or a gel and the solid or gel substance into a liquid.

22. The device according to claim 21, wherein the heating means for applying the stimulus is a resistor positioned in a substrate.

23. The device according to claim 21, wherein the means for applying the stimulus includes the means for putting the substance into contact with the second drop of liquid, said means for putting the substance into contact with the second drop of liquid being electrowetting displacement means for displacing the second drop of liquid.

24. The device according to claim 21, wherein when the substance is a heat-sensitive polymer, the second drop is an enzyme capable of dissolving this gel.

25. The device according to claim 13, wherein the substance is a heat-sensitive polymer.

26. The device according to claim 25, wherein the heat-sensitive polymer is agarose, pectin, carraghenan, gelatin, calcium alginate, a cellulose derivative, chitosan in the presence of acid, polyvinyl chloride, poloxamer, polystyrene, and/or polymethyl methacrylate.

27. The device according to claim 13, wherein the electrowetting means include a substrate with a hydrophobic surface provided with a network of electrowetting electrodes and with electrically conducting means forming a counter-electrode of the electrowetting electrodes, positioned facing each other, said electrodes and the electrically conducting means being connectible to electric power supply means in order to allow an electrostatic force to be applied to the drop of liquid.

28. The device according to claim 27, including a second substrate facing the hydrophobic surface, forming a lid.

29. The device, according to claim 28, wherein the counter-electrode is borne by the lid.

* * * * *